W. MOSSHOLDER AND G. J. SHULTZ.
HOSE CLAMP.
APPLICATION FILED SEPT. 29, 1920.

1,393,811.

Patented Oct. 18, 1921.

INVENTORS
WALTER MOSSHOLDER
GORDON J. SHULTZ
BY
*Shigley & Harney*
ATTORNEYS

UNITED STATES PATENT OFFICE.

WALTER MOSSHOLDER AND GORDON J. SHULTZ, OF MOUNT VERNON, OHIO.

HOSE-CLAMP.

1,393,811.　　　　　Specification of Letters Patent.　　Patented Oct. 18, 1921.

Application filed September 29, 1920. Serial No. 413,491.

*To all whom it may concern:*

Be it known that we, WALTER MOSSHOLDER and GORDON J. SHULTZ, citizens of the United States of America, residing at Mount Vernon, in the county of Knox, and State of Ohio, have invented certain new and useful Improvements in Hose-Clamps, of which the following is a specification.

Our present invention relates generally to hose clamps and our object is the provision of an arrangement which will be simple, strong and durable and will avoid the necessity of screw drivers and other implements of this nature in the connection and disconnection of the clamp. A further object is the provision of a simple construction which may be readily and quickly applied and which is readily adjustable within comparatively wide limits.

In the accompanying drawing illustrating our invention and forming a part of this specification, Figure 1 is a side view illustrating the clamp extended in the inactive position, Fig. 2 is a side view showing the clamp closed in active position.

Referring now to these figures our invention proposes a hose clamp consisting of a clamping band 10 provided adjacent to its opposite ends with outstanding opposing flanges 11 and 12, the latter being preferably formed by doubling the adjacent end portion of the band so as to leave an extension 13 overlapping the other flanged end.

Figures 1, 2:
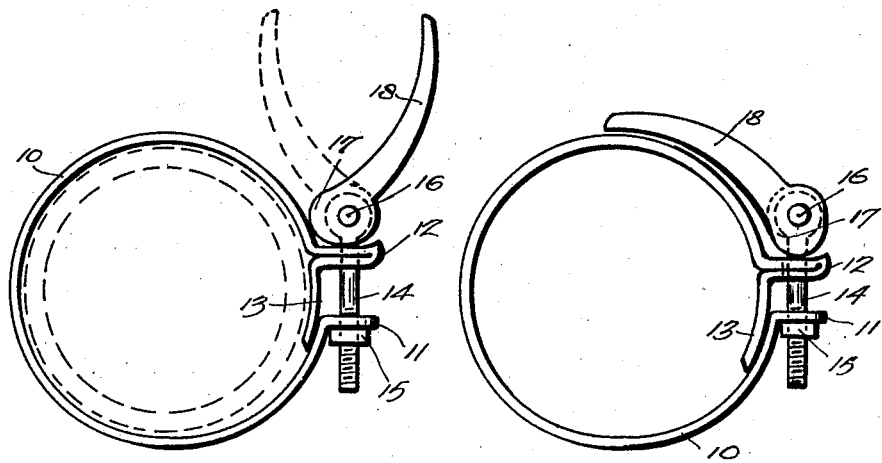
Figures 3, 4:
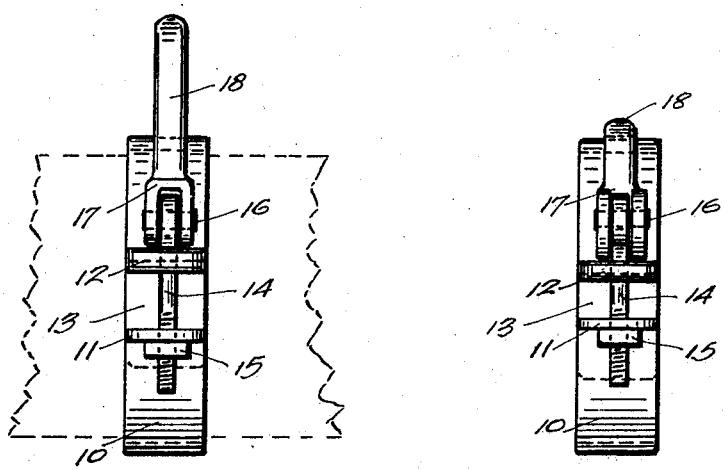
Fig. 3 is a front view with the parts in the position shown in Fig. 1.
Fig. 4 is a front view with the parts in the position shown in Fig. 2.

The flanges 11 and 12 are apertured to receive therethrough a clamping bolt 14, one end of which is threaded to receive an adjusting nut 15 abutting the flanged end 11. The opposite end of this bolt 14 carries a pivot pin 16 forming the working fulcrum of a clamping cam 17 operating against the flanged end 12 and whose handle 18 is preferably curved in order to follow the contour of the band 10 when in the clamped position shown in Figs. 2 and 4, although the clamping cam is readily reversible by virtue of the rotation of the bolt 14 as seen by a comparison of the full and dotted lines in Fig. 1.

In using the hose clamp proposed by our invention, it is inserted in and removed from active position by manipulation of the clamping cam 17 without turning the nut 15 except for purposes of adjustment prior to the locking of the band in place, and it is thus obvious that the clamp proposed by our invention may be readily inserted in and removed from effective position without requiring the use of screw drivers, wrenches or other tools ordinarily required in connection with devices of this nature.

It is of course to be understood that we may form our improved hose clamp of various materials and that the clamping band may for instance be either cast or stamped from sheet metal, in which latter case the flanged end 12 will be formed by doubling the material as shown and previously described.

We claim:

A hose clamp consisting of a clamping band having flanged overlapping ends, a clamping bolt extending loosely through the flanges having an eye at one end and threaded at its opposite end, an adjusting nut on the threaded end of the bolt to engage one of the flanges, a cam locking lever, and a pivot pin extending through the eye and forming a journal for said lever at the other end of the bolt permitting the lever to engage the other flange, said lever having a curved handle arranged to lie in snugly engaging relation against a portion of the band in the locked position.

In testimony whereof we have affixed our signatures.

WALTER MOSSHOLDER.
GORDON J. SHULTZ.